United States Patent [19]
Vali et al.

[11] Patent Number: 6,166,815
[45] Date of Patent: Dec. 26, 2000

[54] CONSTANTLY HIGH SENSITIVITY FIBER OPTIC INTERFEROMETER SENSOR

[75] Inventors: Victor Vali, Laguna Hills; I-Fu Shih, Los Alamitos; David B. Chang, Tustin, all of Calif.

[73] Assignee: Raytheon Company, Lexington, Mass.

[21] Appl. No.: 08/634,549

[22] Filed: Apr. 18, 1996

Related U.S. Application Data

[63] Continuation of application No. 08/194,657, Feb. 7, 1994, abandoned, which is a continuation-in-part of application No. 07/939,250, Sep. 2, 1992, abandoned.

[51] Int. Cl.$^7$ ............................................. G01B 9/02
[52] U.S. Cl. .......................................... 356/477; 356/478
[58] Field of Search .................................. 356/345, 352

[56] References Cited

U.S. PATENT DOCUMENTS

| | | | |
|---|---|---|---|
| 2,381,728 | 8/1945 | Dimmick | 356/352 |
| 3,635,562 | 1/1972 | Catherin | 356/352 |
| 3,675,154 | 7/1972 | Duguay et al. | 356/352 |
| 3,834,790 | 9/1974 | Macken | 356/352 |
| 4,444,503 | 4/1984 | Schiffner | 356/350 |
| 4,512,661 | 4/1985 | Claus et al. | 356/351 |
| 4,552,457 | 11/1985 | Giallorenzi et al. | 356/349 |
| 4,753,529 | 6/1988 | Layton | 356/352 |
| 4,789,240 | 12/1988 | Bush | 356/345 |
| 4,874,249 | 10/1989 | Kersey | 356/350 |
| 5,377,008 | 12/1994 | Ridgway et al. | 356/345 |

OTHER PUBLICATIONS

"Phase Compensation in Interferometric Fiber Optic Sensors," Dandridge et al., Optics Letters, vol. 7, No. 6, Jun. 1983, pp. 279–281.

"Passive Multiplexing Systems for Fiber Optic Sensors," Nelson et al., Applied Optics, Sep. 1980, pp. 2917–2920.

"Demodulating Scheme Fibre Interferometric Sensors Employing Laser Frequency Switching," Kersey et al., Electronics Lett., vol. 19, No. 3, pp. 102–103, (Feb. 13, 1983).

"Characterization of an Eight–Element Time–Division Multiplexed Interferometric Fiber Sensor Array," A.D. Kersey et al., SPIE, vol. 985, Fiber Optic and Laser Sensors VI (1988) pp. 105–112.

"At–Sea Deployment of a Multiplexed Fiber Optic Hydrophone Array," M.L. Henning, C. Lamb, WDD5–1, OFS'88.

*Primary Examiner*—Robert Kim
*Attorney, Agent, or Firm*—William C. Schubert; Glenn H. Lenzen, Jr.

[57] ABSTRACT

A fiber optic interferometric sensor (150) having constantly high sensitivity by use of two lasers (152, 154) that simultaneously output at first and second wavelengths. By judicious choice of the wavelengths, the optical path length difference between the two interferometer paths (164, 166) can be kept near the maximum slope of the interference fringes for one or the other of the wavelengths. The output from the interferometer (160) is divided between first and second detector arms (170, 130). A filter (172) in the first detector arm passes the first wavelength and rejects the second. A filter (182) in the second detector arm passes the second wavelength and rejects the first. A first detector (174) at the output of the first detector arm reads the interference pattern at the first wavelength. A second detector arm reads the interference pattern at the second wavelength.

6 Claims, 2 Drawing Sheets

CONSTANTLY HIGH SENSITIVITY FIBER OPTIC INTERFEROMETER SENSOR

BACKGROUND OF THE INVENTION

This is a continuation-in-part of application Ser. No. 07/939,250, CONSTANTLY HIGH SENSITIVITY FIBER OPTIC INTERFEROMETRIC SENSOR, filed Sep. 2, 1992, by V. Vali et al. now abandoned.

This is a continuation application Ser. No. 08/194,657, filed Feb. 7, 1994 now abandoned.

This invention relates to a new method for achieving a constantly high sensitivity of a fiber optic interferometric sensor by using a laser source that can simultaneously output at two wavelengths.

FIG. 1 illustrates a conventional Mach-Zehnder interferometric sensor 20. Light from a laser 22 at a single wavelength is divided and directed into a fiber optic sensor arm 24 and a fiber optic reference arm 26. The light traversing the respective arms is then combined and fed to a detector to examine the interference fringes.

Typically, the fiber optic interferometric sensor output signal I can be expressed in the following form:

$$I = K(1 + \cos\theta) \tag{1}$$

where K is a constant.

When the interferometer is used as a sensor, $\theta$ will be a function of the measured. The measured is the physical quantity that the sensor is intended to measure, for example, pressure, temperature, displacement, etc. $\theta$ is a function of optical path difference which in turn is a function of the measured. In the case where only the variation of the measured is of interest, one detects the output signal variation. From eq. 1

$$\Delta I = (K \sin\theta)\Delta\theta \tag{2}$$

Eq. 2 implies that the sensor is most sensitive when operating at the condition $\sin\theta \approx 1$ (or $\theta \approx M\pi + \pi/2$, where m is an integer).

The sensor 20 will be least sensitive if $\sin\theta \approx 0$ (or $\theta \approx M\pi$)

For a fiber optic Mach-Zehnder interferometer, $\theta = (2\pi nL/\lambda)$, where $\lambda$ is the wavelength, n is the index of refraction of the fiber and L is the length difference between the sensing arm and the reference arm. As a sensor, L changes slightly to $L+\Delta L$ when the measured changes. This introduces a change in $\theta$ (to $\theta+\Delta\theta$) and consequently, a change in I (to $I+\Delta I$).

The sensor will be most insensitive if L satisfies the following condition (due to temperature fluctuations, for example):

$$L \approx m(\lambda/2n) (\text{i.e., } \theta \approx m\pi) \tag{3}$$

A conventional technique of avoiding this condition is to use a piezoelectric phase modulator in either the sensing arm or the reference arm. The modulator is constructed by winding a certain length of fiber around a cylinder made of a piezoelectric material. A voltage can be applied to the cylinder to cause a stretch of the fiber and induce a phase change in $\theta$ such that $$\theta \approx m\pi + (\lambda/2) \tag{4}$$

This brings the sensor to operate in the most sensitive condition.

The piezoelectric phase modulator must be located at the sensor (either in the sensing arm or the reference arm), which adds weight and volume to the sensor head, and requires electrical wires leading to all sensor heads. Furthermore, this conventional method requires complicated servo controls and signal processing.

It has been suggested, e.g., in "Demodulation Scheme Fibre Interferometric Sensors Employing Laser Frequency Switching," Kersey et al., Applied Optics, 9/1980, pp.2917–2920, and "Phase compensation in interferometric fiberoptic sensors," A. Dandridge et al., Optics Letters, vol. 7, No. 6, June 1982, pp. 279–281, that an interference pattern formed as the output of a Mach-Zehnder interferometer is assured of sensitivity by sequentially forming it with the wavelengths of light satisfying the condition $$\delta\phi = (\pi/2) \tag{5}$$

where $$\delta\phi = \delta(L2\pi/\lambda) = -(L\delta\lambda/\lambda^2)2\pi \tag{6}$$

i.e., $$\delta\lambda/\lambda = -(\lambda/4L) \tag{7}$$

where $\delta\phi$ denotes the phase difference in the light traversing the two arms of the interferometers, $\delta\lambda$ is the wavelength difference between wavelengths of the two pulses, $\lambda$ is the (nominal) wavelength of the light used ($\delta\lambda \ll \lambda$), and L is the path difference between the two arms.

It is therefore an object of the present invention to provide a means for achieving a constantly high sensitivity of a fiber optic interferometric sensor without the use of piezoelectric phase modulators and servo controls.

A further object is to provide fiber optic interferometric sensor which is operated at a continuously high sensitivity level by simultaneous operation at different wavelengths.

SUMMARY OF THE INVENTION

A fiber optic interferometer sensor is described which is capable of operating at a constantly high sensitivity. The sensor includes laser source means for simultaneously providing laser light at first and second wavelengths. Typically, the laser source means includes first and second lasers operating at the respective first and second wavelengths and an optical combiner for combining the light from the two lasers. First and second fiber optic sensor arms of different optical path lengths are provided, each arm having an input port and an output port. The sensor further comprises means for dividing the laser light at the first and second wavelengths between the sensor arm input ports, and means for combining the light from the output ports.

Means are provided for dividing the combined light from the sensor arm output ports between first and second detector optical path arms, each arm having an input port and an output port. The first detector arm include; a first filter having a passband centered at the first wavelength for passing light at the first wavelength and for rejecting light at the second wavelength. The second detector arm includes a second filter having a passband centered at the second wavelength for passing light at the second wavelength and rejecting light at the first wavelength. A first detector is responsive to light at the first detector arm output port to provide a first detector output. A second detector is responsive to light at the second detector arm output port to provide a second deflector output.

A processor can optionally be included in the sensor system for processing the first and second detector outputs in response to light at the respective first and second wavelengths to provide a sensor output.

In accordance with an aspect of the invention, the first and second wavelengths are selected such that the difference in phase $\phi$ due to operation at the wavelengths is $\pi/2$, where $\phi=(2\pi nL/\lambda)$, n is the index of refraction of the fiber optic sensor arms, $\lambda$ is the wavelength, and L is the optical path difference between the first and second sensor arms.

In one exemplary embodiment, the processor comprises means for operating the laser source means under quiescent conditions to obtain interferometer detector background outputs $I_1$ and $I_2$ at the respective first and second detectors, means for obtaining the first and second detector output signals under the perturbation condition being measured by the sensor at the first and second wavelengths to obtain respective first and second perturbation detector outputs $\Delta I_1$ and $\Delta I_2$, and means for processing the output values $I_1$, $I_2$, $\Delta I_1$ and $\Delta I_2$ to obtain the sensor output.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

For a fiber optic Mach-Zehnder interferometer sensor, since $\theta=(2\pi nL/\lambda)$, $\theta$ can be changed by changing $\lambda$ instead of changing L as in the conventional technique used to improve sensitivity. This invention relates to a new technique of operating the sensor in such a way that the sensitivity is constantly high without using a piezoelectric phase modulator. A laser source is employed which can output two slightly different wavelengths, $\lambda$ and $\lambda+\Delta\lambda$. In one embodiment, $\Delta\lambda$ is chosen such that $$\theta(\lambda)-\theta(\lambda+\Delta\lambda)=(\pi/2) \tag{8}$$

The sensor can operate at those two wavelengths alternately. If the variation of the output signal due to perturbations sensed by the sensor, when operating at wavelength $\lambda$, is $$\Delta I_\lambda = K \sin\theta \Delta\theta$$

then the output operating at wavelength $\lambda+\Delta\lambda$ will be $$\Delta I_{\lambda+\Delta\lambda} = K \sin(\theta+(\pi/2))\Delta\theta = K \cos\theta\Delta\theta$$

If $\Delta I$ is defined as $((\Delta I_\lambda)^2+(\Delta I_{\lambda+\Delta\lambda})^2)^{1/2}$, $\Delta I$ will be independent of $\theta$ because $$\Delta I=((K \sin\theta\Delta\theta)^2+(K \cos\theta\Delta\theta)^2)^{1/2}=K\Delta\theta \tag{9}$$

Therefore, by operating the sensor with two slightly different wavelengths in accordance with the invention, a constantly high sensitivity can be obtained.

The required $\Delta\lambda$ to satisfy eq. 8 can be estimated as follows:

$$\Delta\theta=(2\pi nL/\lambda^2)\Delta\lambda=(\pi/2) \tag{10}$$

or $$\Delta\lambda=(\lambda^2/4nL)$$

For L=100 cm, $\lambda=1$ $\mu$m$=10^{-4}$ cm, and n=1.5, $$\Delta\lambda=((10^{-4})^2)/4\times1.5\times100)=1.67\times10^{-11} \text{ cm} \tag{11}$$

or $$(\Delta\lambda/\lambda)=(-(\Delta f/f))=1.67\times10^{-7}$$

This is the required relative laser wavelength difference for $\Delta\theta=(\pi/2)$, for the foregoing exemplary dimensions and conditions.

The lasing wavelength $\lambda$ of a laser is determined by the cavity resonance condition:

$$\lambda=L_c/Nn \tag{12}$$

where $L_c$=effective cavity length (between the laser mirrors);

N=an integer; and n=index of refraction.

Thus, for a given cavity, the resonance frequency can be changed slightly by altering the index of refraction n, or by altering the effective cavity length $L_c$. Exemplary methods of altering the index of refraction include the disposition of an electro-optic or piezoelectric material in the cavity, subjected to different voltages. The effective cavity length is equal to the product of the geometric cavity length and the index of refraction. So, changing the index of refraction effectively changes the cavity length.

Figure 1:
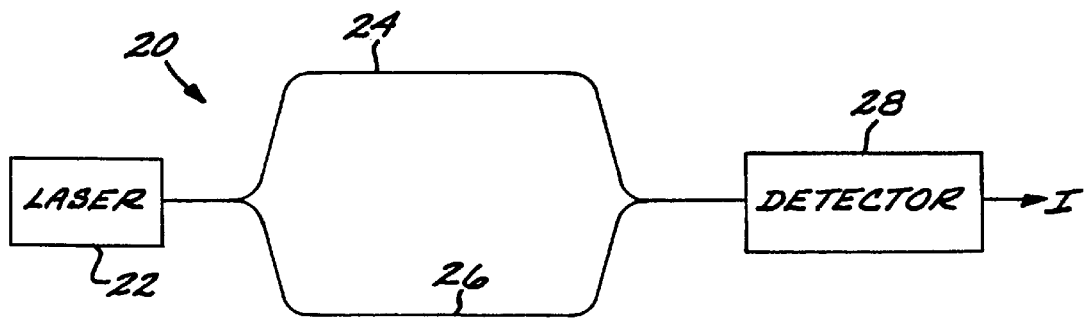
FIG. 1 is a simplified schematic illustrative of a conventional Mach-Zehnder fiber optic interferometric sensor.
Figure 2:
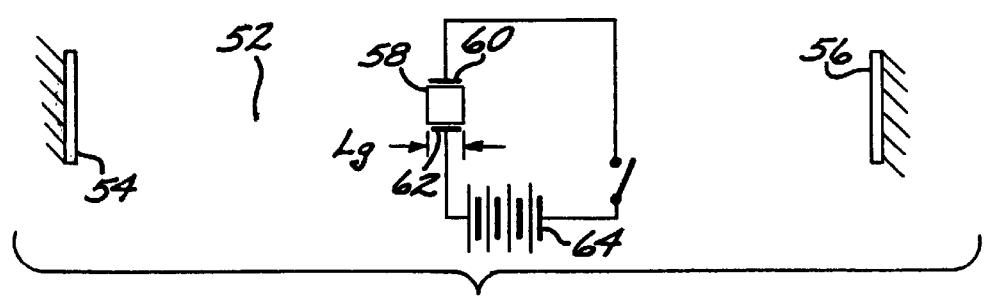
FIG. 2 illustrates the use of an electro-optic material to alter the lasing wavelength of a laser of a fiber optic interferometric sensor.

An electro-optic material (such as $LiNbO_3$) can be used to change the optical path length $L_c$ of a laser cavity and, therefore, also change the laser wavelength. FIG. 2 shows the laser cavity 52 extending between mirrors 54 and 56, with mirror 56 half-silvered to permit output light to exit the cavity. A block 58 of electro-optic material is disposed in the cavity 52 in the light path between the cavity mirrors 54 and 56. The electro-optic material block 58 has a geometric length $L_g$ and an index of refraction n. Conductive plates 60 and 62 are disposed on opposite sides of the block 58, and are connected to a voltage source 64 to impress an electric field across the block 58, whose index of refraction will depend on the magnitude of V, the voltage of the voltage source 64. Therefore, $$\Delta L_c=L_g\Delta n+n\Delta L_g \tag{13}$$

where $\Delta L_g=0$. Therefore, $$\Delta L_c=L_g\Delta n \tag{14}$$

For $LiNbO_3$ the electro-optic coefficient C is $3\cdot10^{-9}$ cm/v. Using a 0.5 cm long $LiNbO_3$ crystal as block 58, $$\Delta L_c=0.5\cdot\Delta n$$

Here $\Delta n=C(V/l)=10^{-7}$ where v/l is the electric field strength on the $LiNbO_3$ crystal (10 volts across a 3 mm wide crystal), or $\Delta L_c=0.50\cdot10^{-7}=5\cdot10^{-6}$ cm.

Therefore, $\Delta L_c/L_c=5\cdot10^{-6}/50=10^{-7}$ where $L_c$ is the total laser cavity length. Therefore, the quadratiure condition of eq (9) can be satisfied for a one meter long sensor fiber by using a 17 volt square wave voltage on the LiNbO$_3$ crystal in the laser cavity.

Figure 4:
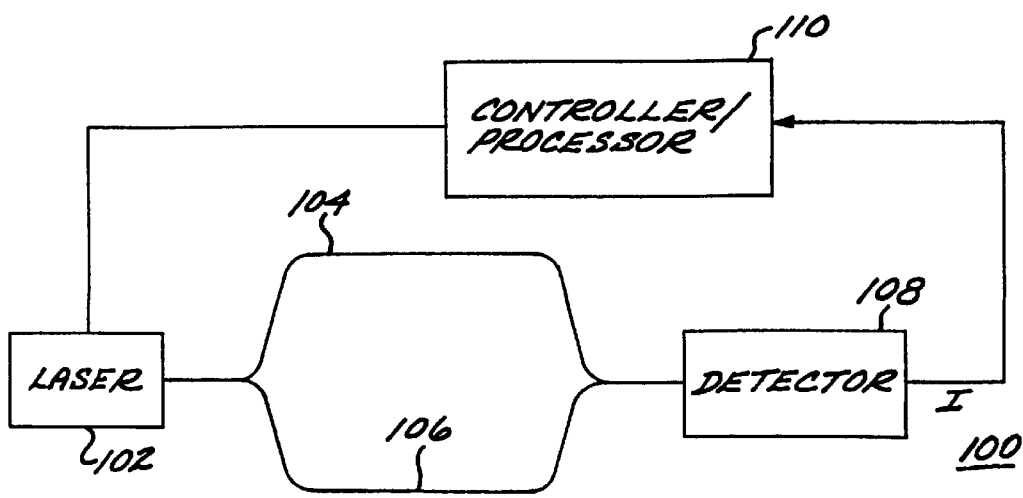
FIG. 4 is a schematic block diagram of a Mach-Zehnder interferometer sensor operating at different wavelengths.

FIG. 4 shows a simplified schematic block diagram of a Mach-Zehnder interferometer sensor 100. The sensor 10 includes a laser 102 which alternatively outputs light at two wavelengths. The laser output is divided between the two sensor arms 104 and 106, and the outputs of the two sensor arms are combined and fed to the detector 108, whose output I is fed to a controller/processor 110. The processor 110 controls the operation of the laser 102 to laser at a selected one of the two possible lasing wavelengths, register the output I value, change the lasing wavelength to the other of the two wavelengths, register the output I value for this wavelength, and then processing the two I values to determine the sensor output using the relationship of eq. 9 above.

Another method of operating the interferometer system is shown by the following. Let x represent the optical path length difference between the two arms of the interferometer. Under a quiescent (calibration) condition, with no external noise, the interferometer background readings $I_1$ and $I_2$ at the respective two wavelengths of operation ($\lambda_1$ and $\lambda_2$) are $$I_1(x)=A(1+\cos(k_1 x+\phi_1)) \quad (15)$$

$$I_2(x)=A(1+\cos(k_2 x+\phi_2)) \quad (16)$$

where $k_1=2\pi/\lambda_1$ and $k_2=2\pi/\lambda_2$.

Under the perturbation condition being measured by the system, $$\Delta I_1(x)=A(-\Delta x)((\sin(k_1 x+\phi_1))k_1 \quad (17)$$

$$\Delta I_2(x)=A(\Delta x)((\sin(k_2 x+\phi_2))k_2 \quad (18)$$

Depending on x and $\phi$ values, relative changes in the sine value can be great or small. If the argument for one wavelength is near zero (i.e zero or $\pi$), it is very unlikely the argument for the other $\lambda$ will also be near zero or $\pi$. The object is to solve for $\Delta x$. There are four unknowns, A, ($k_1 x+\phi_1$), ($k_2 x+\phi_2$) and $\Delta x$. $I_1$, $I_2$, $\Delta I_1$, and $\Delta I_2$ can be measured. Equations (15)–(18) can then be solved for $\Delta x$, and typically a digital processor comprising the interferometer system can be programmed to perform the computation.

The advantage of this method of using the two-wavelength source is that $\Delta\lambda$ between $\lambda_1$ and $\lambda_2$ need not be selected to satisfy eq. (8). However, more data processing is needed to solve for $\Delta x$ and the measurement accuracy for $I_1$, $I_2$, $\Delta I_1$, and $\Delta I_2$ depends on $k_1 x+\phi_1$ and $k_2 x+\phi_2$.

Figure 3:
FIG. 3 illustrates the use of a diffraction grating to alter the lasing wavelength of the laser of a fiber optic interferometric sensor.

Since $\lambda_1$, and $\lambda_2$ need not be selected to satisfy eq. (8), another scheme of changing the laser wavelength can be used. FIG. 3 illustrates the use of a diffraction grating to alter the laser wavelength. Here the cavity 70 extends between mirror 72 and diffraction grating 74, disposed at an angle A relative to the normal to mirror 72. The angle A determines a wavelength, say $\bar{\lambda}$, for which the light diffracted from the grating will be along the axis of the cavity. If at the same time eq. (12) can be satisfied with an integer N', i.e., $\bar{\lambda}=L_c/N'n$, the laser will lase at the wavelength $\bar{\lambda}$. So by changing A mechanically by operation of grating positioner device 76, a series of discrete laser wavelengths can be generated.

In accordance with the invention, the different wavelengths are transmitted through the sensor simultaneously instead of sequentially. This has the advantage of maintaining sensitivity without having to pulse the laser source, provide optical switching, or provide electronics for processing the signals and pulsing the laser. An exemplary embodiment employing simultaneous transmission of light at the different wavelengths is depicted in FIG. 5.

Figure 5:
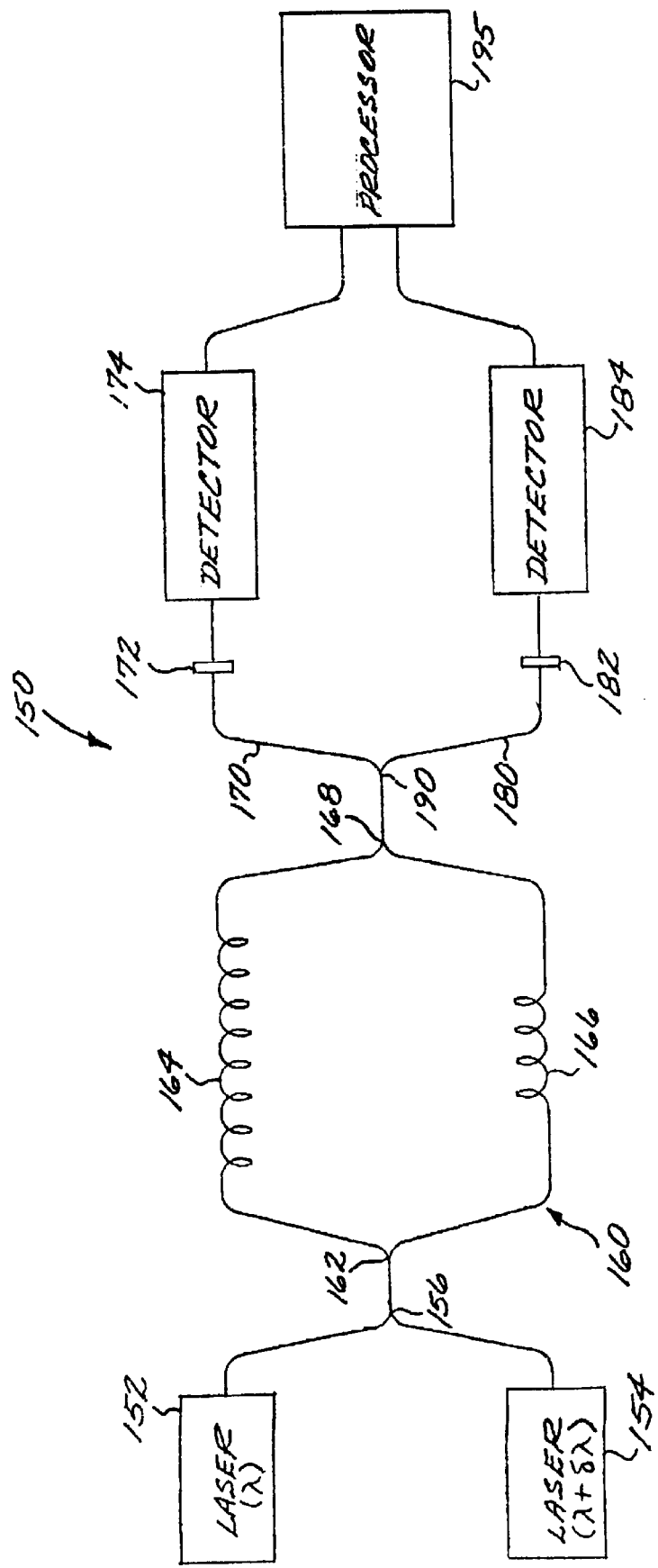
FIG. 5 is a schematic block diagram of a Mach-Zehnder interferometer sensor operating simultaneously at two different wavelengths in accordance with the invention.

In the system 150 of FIG. 5, laser light sources 152 and 154 (laser 152 at wavelength $\lambda$, and laser 154 at wavelength $\lambda+\delta\lambda$) feed light into a fiber optic Mach-Zehnder interferometric sensor 160. The light from the respective lasers is combined by optical combiner 156, and fed into the sensor 160. There, beamsplitter 162 divides the light from the laser sources between the sensor arm 164 and reference arm 166 of the sensor 160.

The output of the Mach-Zehnder sensor 160 is fed through a through a beam combiner 168 and then divided by beam splitter 190 where and the divided signal is fed into the input ports of two detector arms 170 and 180. Arm 170 contains a filter 172 having a bandpass centered at $\lambda$ and rejecting $\lambda+\delta\lambda$. Arm 180 contains a filter 182 having a bandpass centered at $\lambda+\delta\lambda$ and rejecting light at wavelength $\lambda$. A detector 174 is positioned at the output port of the arm 170. A detector 184 is positioned at the output port of the arm 180.

The interference pattern formed by the light at $\lambda$ is read by detector 174, and the interference pattern formed by the light at $\lambda+\delta\lambda$ is read by detector 174, ensuring that sensitivity is maintained. The detector output having the highest magnitude will indicate the wavelength at which the sensor 150 is operating at highest sensitivity. The two detector outputs can be recorded. optionally, a processor 195 receives the outputs from the first and second detectors, e.g., through analog-to-digital conversion (rot shown), and processes the signals to provide a senior output signal. The processor 195 can operate, in an exemplary embodiment, to calculate intensity variations in the outputs of the respective first and second detectors, to square the intensity variation values from the respective detectors, add the two squared values, and then calculate the square root of the sum to provide a sensor output signal.

The invention is not limited to Mach-Zehnder interferometers, but rather is applicable to all interferometers that split the input fiber into multiple arms and then combine these arms to form an interference which is detected by monitoring the output intensity variation.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A fiber optic interferometer sensor, operable at a constantly high sensitivity, comprising:

a single laser source means for simultaneously providing laser light at alternately first and second wavelengths;

first and second fiber optic sensor arms of different optical path lengths, each arm having an input port and an output port;

means for dividing the single source laser light at said alternate first and second wavelengths between said input ports of said first and second sensor arms;

means for combining the frequency disparate laser light from said output ports of said first and second sensor arms;

means for dividing said combined light between first and second detector optical path arm, each arm having an input port and an output port, said first detector arm including a first filter having a passband centered at said first wavelength for passing light at said first wavelength and for rejecting light at said second wavelength, said second detector arm including a second filter having a pass band centered at said second wavelength for passing light at said second wavelength and rejecting light at said first wavelength;

a first detector responsive to light at said output port of said first detector arm to provide a first detector output;

a second detector responsive to light at said output port of said second detector arm to provide a second detector output; and a processor for processing said first and second detector outputs in response to said laser light at said respective first wavelength for passing light and said second wavelength for passing light to provide a sensor output, wherein said processor is responsive to a magnitude of a variation in said detector outputs, and wherein said sensor output is computed as a square root of the sum of the squares of said variation magnitudes for said first and second wavelengths.

2. The sensor of claim 1 wherein said first and second wavelengths of said laser light emitted from said single laser source, are selected such that a difference in phase $\phi$ due to operation at said first and second wavelengths is $\pi/2$, where $\phi=2\pi nL/\lambda$, n is an index of refraction of said fiber optic sensor arms, $\lambda$ is a wavelength, and L is the optical path difference between said first and said second sensor arms.

3. The sensor of claim 1 wherein said processor comprises means for operating said single laser source means under quiescent conditions to obtain interferometer detector background outputs $I_1$ and $I_2$ at the respective first and second detectors, means for obtaining first and second detector output signal values under a perturbation condition being measured by the sensor at said first and said second wavelengths to obtain respective first and second perturbation detector outputs $\Delta I_1$ and $\Delta I_2$, and means for processing said output values $I_1$, $I_2$, $\Delta I_1$ and $\Delta I_2$ to obtain said sensor output.

4. The sensor of claim 1 wherein said sensor is a Mach-Zehnder interferometer sensor.

5. The sensor of claim 1 wherein said laser source means comprises a first laser operating at said first wavelength, a second laser operating at said second wavelength, and optical combining means for combining respective first and second laser output signals to provide said laser light simultaneously at said first and second wavelengths.

6. A fiberoptic interferometer sensor, operable at a constantly high sensitivity, comprising:

a laser source for simultaneously providing laser light at first and second wavelengths;

first and second fiberoptic sensors arms of different optical pathlengths, each arm having an input port and an output port;

means for dividing the laser light at said first and second wavelengths between said input ports of said first and second sensor arms;

means for combining the laser light from said output ports of said first and second sensor arms;

means for dividing said combined light between first and second detector optical path arms, each arm having an input port and an output port, said first detector arm including a first filter having a first passband centered at said first wavelength for passing light at said first wavelength and for rejecting light at said second wavelength, said second detector arm including a second filter having a passband centered at said second wavelength for passing light at second wavelength and rejecting light at said first wavelength;

a first detector responsive to light at said output port of said first detector arm to provide a first detector output; and a second detector responsive to light at said output port of said second detector arm to provide a second detector output.

* * * * *